(12) United States Patent
Naito (10) Patent No.: US 6,233,268 B1
(45) Date of Patent: May 15, 2001

(54) LASER APPARATUS

(75) Inventor: Yasuyuki Naito, Aichi (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 09/240,609

(22) Filed: Feb. 1, 1999

(30) Foreign Application Priority Data

Feb. 2, 1998 (JP) .................................................. 10-036755

(51) Int. Cl.⁷ ....................................................... H01S 3/08
(52) U.S. Cl. ............................... 372/99; 372/99; 372/20; 372/108; 372/107
(58) Field of Search .............................. 372/99, 20, 108, 372/107

(56) References Cited

U.S. PATENT DOCUMENTS

| | | | | |
|---|---|---|---|---|
| 3,670,259 | * | 6/1972 | Young | 372/15 |
| 4,288,330 | * | 9/1981 | Strub | 210/777 |
| 4,757,507 | * | 7/1988 | Wondrazek et al. | 372/23 |
| 4,852,115 | * | 7/1989 | Viherkoski | 372/92 |
| 4,920,541 | * | 4/1990 | Baumgartner et al. | 372/23 |
| 5,249,192 | * | 9/1993 | Kuizenga et al. | 372/23 |
| 5,426,662 | * | 6/1995 | Mefferd et al. | 372/99 |
| 5,659,567 | * | 8/1997 | Roberts et al. | 372/82 |
| 6,058,130 | * | 5/2000 | Shinji et al. | 372/99 |

FOREIGN PATENT DOCUMENTS 2895014    1/1997    (JP) .

OTHER PUBLICATIONS

U.S. application No. 09/012,214, Shinji et al., filed Jan. 23, 1998.

* cited by examiner

*Primary Examiner*—Frank G. Font
*Assistant Examiner*—Delma R. Floris Ruiz
(74) *Attorney, Agent, or Firm*—Finnegan, Henderson, Farabow, Garrett & Dunner, L.L.P.

(57) ABSTRACT

A laser apparatus for oscillating laser beams has a resonator 7 in which an output mirror 4 and a reflection mirror 5 (6) are disposed opposite to each other on both sides of a laser tube 1. The reflection mirror 5 is rotated about a first axis and a second axis intersecting the first axis at a predetermined angle, respectively. A control section measures output values of laser beams corresponding to three angles during the rotation of the mirror 5 to determine a rotating range. Then, the optimum angles of the mirror 5 with respect to the respective first and second axis directions are determined by causing the mirror 5 to sequentially rotate in the determined rotating range.

9 Claims, 5 Drawing Sheets

LASER APPARATUS

BACKGROUND OF THE INVENTION

1. Field of the Invention

The present invention relates to a laser apparatus which is used to treat a diseased part of a patient by irradiating a treatment laser beam emitted from a laser source to the part to be treated.

2. Description of Related Art

Conventionally, there have been known laser apparatus which emit a treatment laser beam to the fundus of a patient's eye, thereby photocoagulating a part to be treated. A laser source used for such the laser apparatus excites and produces a laser beam in a laser tube. The light beam is reflected by a pair of mirrors (a reflection mirror and an output mirror) disposed in parallel and opposite to each other on both sides of the laser tube to resonate between the mirrors. Thus, a laser beam oscillation is ensured. In this case, if the setting angle of the reflection mirror deviates even a little from the proper angle, the mirror could not oscillate and emit laser beams or would reduce laser oscillating efficiency. This may cause inconveniences such as a lowering in output power of laser beams as compared with a setting power level. For solving the above problem, conventionally, the laser apparatus, upon turning the power thereof on, starts laser oscillation for an initial setting and drives the reflection mirror to rotate at the same time, thereby to measure the output power of laser beams during the rotation of the mirror. Based on the measurement results, the reflection mirror are adjusted to the angle where the highest laser oscillating efficiency can be obtained. An optimum laser oscillation can be ensured accordingly.

However, the above measurement of laser output power for an optimum laser oscillation is made by rotating the reflection mirror by every predetermined pulse, thereby taking a very long time and keeping an operator waiting for completion of the measurement.

In addition, the measurement, needing a long time, causes an increase of the consumption of electricity in the laser apparatus. As a result, the amount of heat generated is increased, resulting in a rise in temperature in the laser apparatus. This causes a problem that the temperature in the laser apparatus tends to come faster to the previously set upper limit of temperature where the laser apparatus can be operated. Especially, a laser treatment apparatus used for surgical operations would stop operating when the upper limit temperature is reached during the surgical operation. To prevent the stop of the apparatus, there is desired the laser apparatus capable of reducing the amount of heat generated therein to a minimum.

SUMMARY OF THE INVENTION

The present invention has been made in view of the above circumstances and has an object to overcome the above problems and to provide a laser apparatus capable of detecting fast an optimum angle of reflection mirror(s) where excellent laser oscillating efficiency can be obtained, and of reducing the consumption of electricity.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a laser apparatus for generating laser light beams including a laser oscillation device for oscillating laser beams, a resonation device with a plurality of reflection mirrors for reflecting the laser beams oscillated by the laser oscillation device, a rotation device for rotating at least one of the reflection mirrors about a first axis and a second axis respectively, the second axis intersecting the first axis at a predetermined angle, a light quantity measurement device for measuring a light quantity of the laser beams emitted from the resonation device, a rotation angle determination device for determining a first rotation angle at which the light quantity measurement device detects an output of the laser beam from the resonation device while the reflection mirror is rotated about the first axis and the second axis respectively, and a second and a third rotation angles which are on both sides of the first rotation angle, a rotating range determination device for determining a rotating range of the reflection mirror, the range being supposed to include a rotation angle at which a maximum quantity of laser beam is obtained, based on measurement values measured by the light quantity measurement device when the reflection mirror(s) is positioned at the first, second, and third rotation angles determined by the rotation angle determination device, and an angle determination device for determining an optimum rotation angle of the reflection mirror(s) with respect to the first axis and the second axis respectively, at which the maximum quantity of laser beam is obtained, based on the measurement values measured by the light quantity measurement device when the reflection mirror is rotated successively within the rotating range determined by the rotating range determination device.

Furthermore, it is preferable that the rotation device rotates the reflection mirror sequentially at first predetermined intervals in order to search the first rotation angle.

In the laser apparatus, preferably, an interval defined by the second rotation angle and the first rotation angle and an interval defined by the third rotation angle and the first rotation angle are both the same first predetermined interval, wherein the reflection mirror is rotated within the rotating range determined by the rotating range determination device at second predetermined intervals which are smaller than the first predetermined intervals.

With the above structure, the laser apparatus of the present invention operates as follows;

If a pulse motor is used for the rotation device, for instance, assuming the first predetermined interval to be 500 pulses, the second predetermined interval to be 10 pulses, the rotation of the reflection mirror at 500 pulse intervals makes it possible to rapidly detect the first rotation angle of the reflection mirror at which the laser quantity of a predetermined level or more is obtained.

After detection of the first rotation angle, the second rotation angle and the third rotation angle are determined to be positioned on both sides of the first rotation angle and separately therefrom by the intervals corresponding to 500 pulses each. The quantity (power) of output laser beams corresponding to the three angles is compared to select one from among the three rotation angles to determine the rotating range. While the reflection mirror is rotated within the rotating range by 10 pulses each, the laser quantity at each point is measured. Thus, the optimum rotation angle of the reflection mirror, at which the maximum laser quantity is obtained, is finally determined.

According to the present invention, the optimum angle of the reflection mirror can rapidly be found. For example, although it would generally take 12 seconds to determine the optimum angle in the conventional laser apparatus, the present invention can reduce the time needed to determine the angle to less than half.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
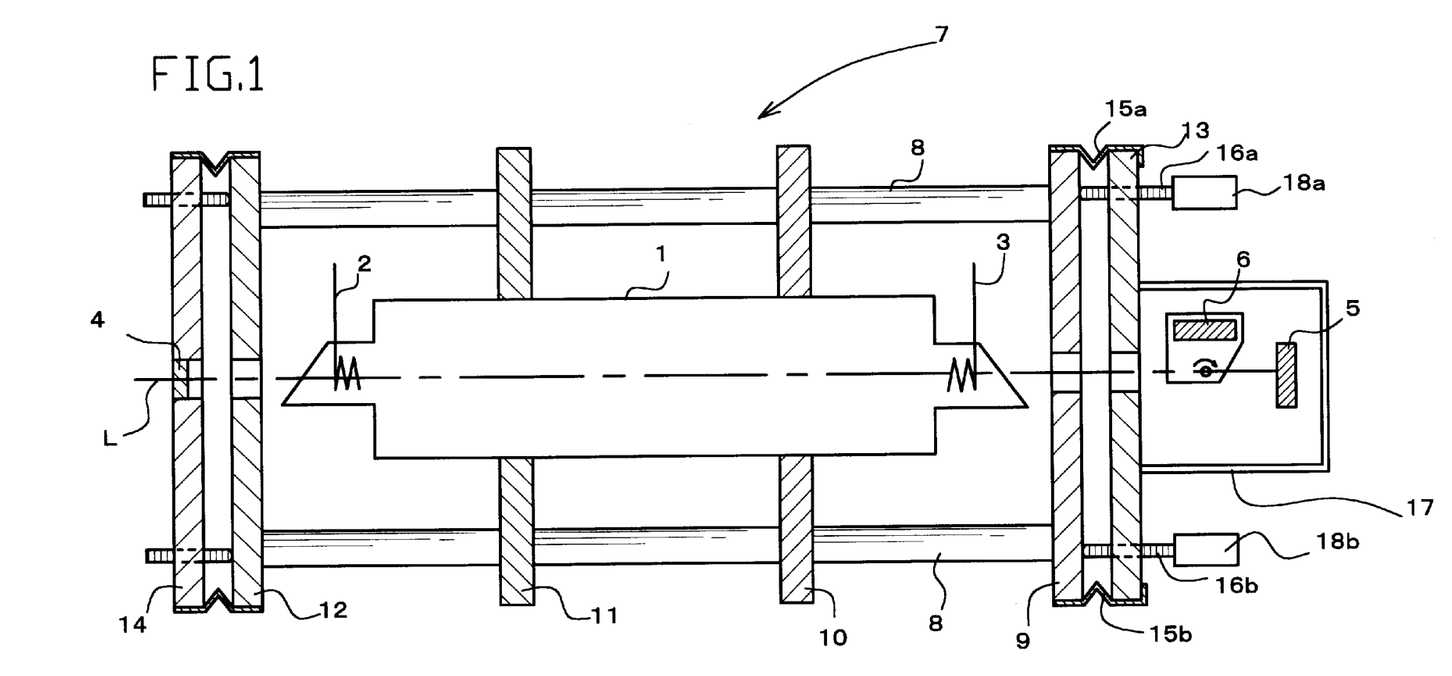
FIG. 1 is a schematic sectional view of a resonator used in an ion laser apparatus in an embodiment according to the present invention.

A detailed description of one preferred embodiment of a laser apparatus embodying the present invention will now be given referring to the accompanying drawings. In this embodiment, the laser apparatus according to the present invention is applied to a laser treatment apparatus, namely, an ion laser apparatus that is capable of selecting a laser light beam having a plurality of wavelength regions. FIG. 1 is a schematic sectional view of a resonator used in the ion laser apparatus in the present embodiment.

The resonator 7 is provided with a laser tube 1 wherein a Krypton gas as a gas material for a laser oscillation is sealed. In the present embodiment is used a Krypton (Kr) laser which oscillates a red light (647.1 nm), a yellow light (568.2 nm), and a green light (530.9 nm, 520.8 nm). An anode 2 and a cathode 3 are arranged on both sides of the ion laser tube 1. With such a structure, a discharge is performed by applying a voltage into the sealed gas material.

The resonator 7 is further provided with an output mirror 4, a first total reflection mirror 5, and a second total reflection mirror 6. The mirror 5 has the property of reflecting a yellow light and a green light and is fixedly disposed on an optical axis L of a laser beam. The mirror 6 has the property of reflecting a red light and is disposed movably between a position out of the optical axis L and another position on the optical axis L. The output mirror 4 has the transmission rate between 1–3% for all the wavelength regions of the red, the yellow, and the green light beams. Thus, the mirror 6 disposed on the optical axis L and the output mirror 4 constitute a resonating system which oscillates a red laser light. When the mirror 6 is moved away from the optical axis L, alternatively, the mirror 5 and the output mirror 4 constitute a resonating system which oscillates a yellow and a green laser light. Concerning detailed description of a switching mechanism for the mirrors 5 and 6 to oscillate laser beams having different wavelength regions, see U.S. patent application Ser. No. 09/012,214.

To amplify the laser beams, the output mirror 4, the reflection mirrors 5 and 6 are required respectively to have an accurate positional relation with respect to the laser tube 1. Therefore, the resonator 7 in the present embodiment is structured as follows.

Figure 2:
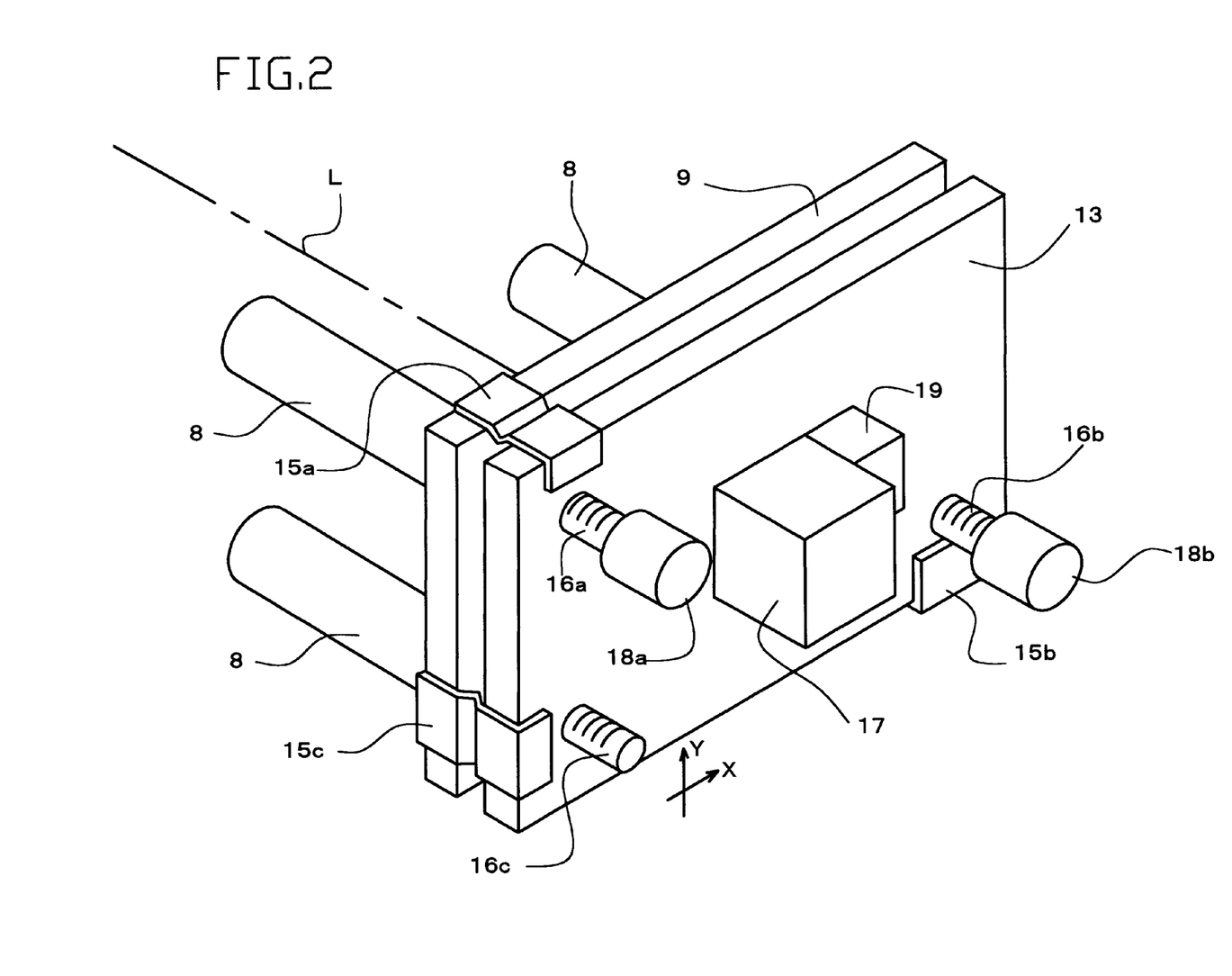
FIG. 2 is a partial side perspective view of the resonator in the embodiment, viewed from obliquely above of a cathode side of an ion laser tube therein.

The resonator 7 is constructed of three rods 8 (one of them is not illustrated in FIG. 1) consisting of a material having a small thermal expansion rate such as inber or super inber and plates 9, 10, 11, and 12 for combining the rods 8. The laser tube 1 is retained by the plates 10 and 11. Further, the plates 9 and 12 are attached to the both ends of the rods 8. A movable plate 13 for retaining the mirrors 5 and 6 is connected to the plate 9 via plate springs. Similarly, a movable plate 14 for retaining the output mirror 4 is connected to the plate 12 via plate springs. FIG. 2 is a perspective view of a part of the resonator 7, viewed from obliquely above of the cathode side of the laser tube 1. As shown in FIG. 2, the plates 9 and 13 are connected to each other via three plate springs 15a, 15b, and 15c.

The plate 13 is formed with three screw holes in which three adjust screws 16a, 16b, and 16c are screwed. Each tip end of the screws 16a–16c is in contact with the plate 9. Similarly, the movable plate 14 is connected to the plate 12 with three screws and three plate springs. Motors 18a and 18b which are pulse motors are mounted on the screws 16a and 16b of the movable plate 13. When the motors 18a and 18b are driven, the screws 16a and 16b are turned clockwise or counterclockwise with their tip ends contacting the plate 9. The turning of the screw 16a causes the plate 13 to be fine rotated about an X-axis on the screw 16c serving as a fulcrum point. The turning of the screw 16b causes the plate 13 to be fine rotated about a Y-axis on the screw 16c. With this structure, the mirrors 5 and 6 can be adjusted to have respective optimum angles with respect to the laser optical axis L. The adjustment of the plates 13 and 14 are made in advance by manual operation with the adjust screws at the assembly or maintenance of the resonator. At the time of shipment, therefore, the ion laser apparatus is in a state of capable of performing a laser oscillation.

A cover 17 is connected to the plate 13 to protect the mirrors 5 and 6 from dusts. A motor 19 is attached outside of the cover 17. With the motor 19, the mirror 6 is allowed to be placed on the optical L.

Figure 3:
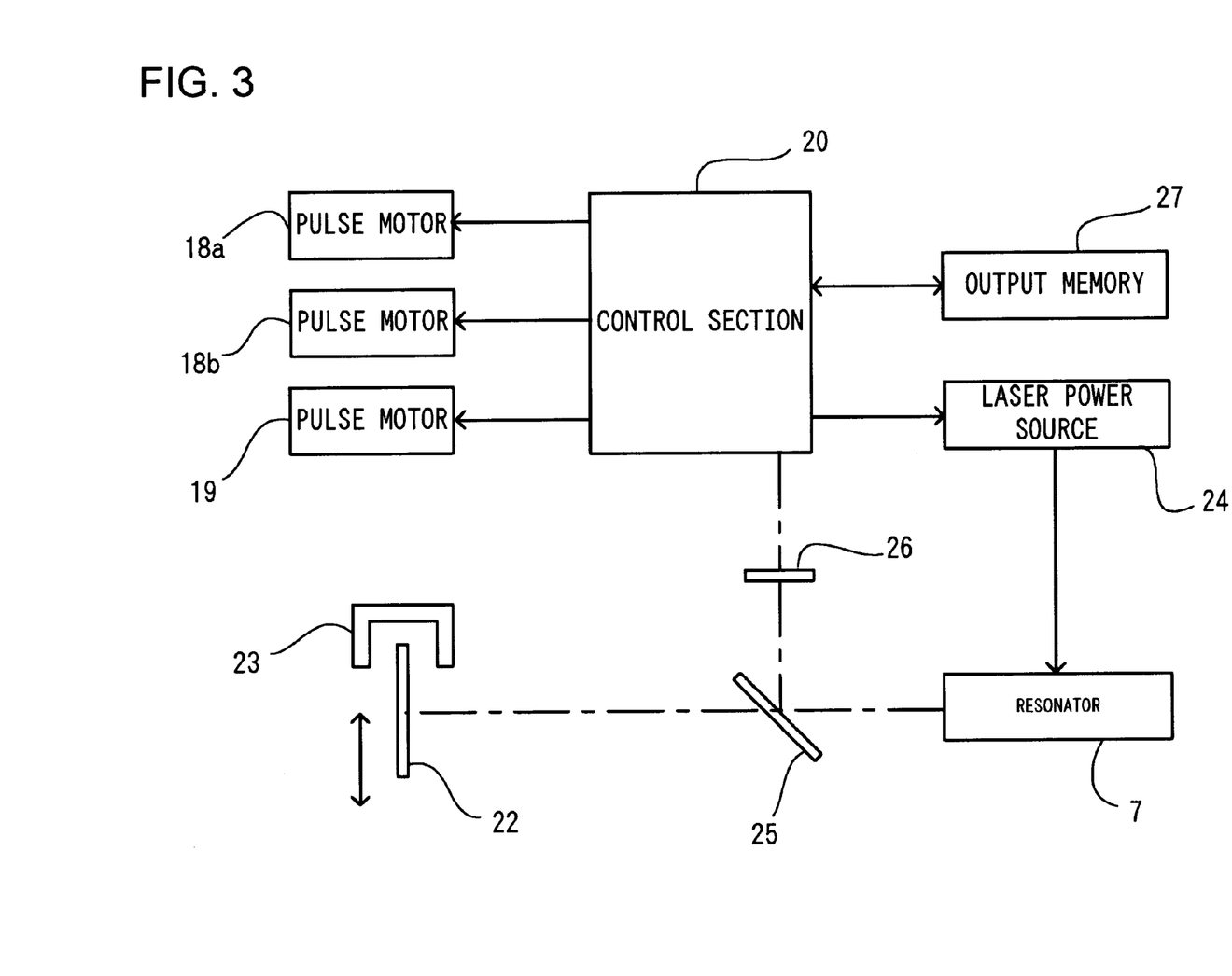
FIG. 3 is a schematic view of a control system, the resonator, and peripheral devices thereof in the ion laser apparatus in the embodiment.

Operation of the apparatus constructed as above will be described with reference to FIG. 3 which is a schematic block diagram of a control system of the apparatus.

Upon turning the power of the apparatus on, a control section 20 confirms through a shutter sensor 23 as to whether or not the insertion of a safety shutter 22 is surely made. When the shutter 22 is surely inserted, the control section 20 checks operating conditions by driving the motor 19 to move the mirror 6 in place on the optical axis L. After completion of the check on the operating conditions, the mirror 6 is moved to another position out of the optical axis L, thereby switching to the mirror 5. Thereafter, a power source 24 is driven to supply a predetermined amount of current (30A in the embodiment) to the resonator 7. The resonator 7, supplied with the current from the power source 24, oscillates a laser beam. A part of the laser beam is reflected by a beam splitter 25 which transmits a part of a laser beam and reflects a part of the laser beam, and introduced into an output sensor 26. The output sensor 26 detects the output of the laser beam oscillated from the resonator 7.

When the output sensor 26 does not detect laser output at this time, the control section 20 causes the motors 18a and 18b to operate the adjust screws 16a and 16b in order to detect the angle of the mirror 5 at which the laser output can be detected, using the following adjustment manner.

Figure 4:
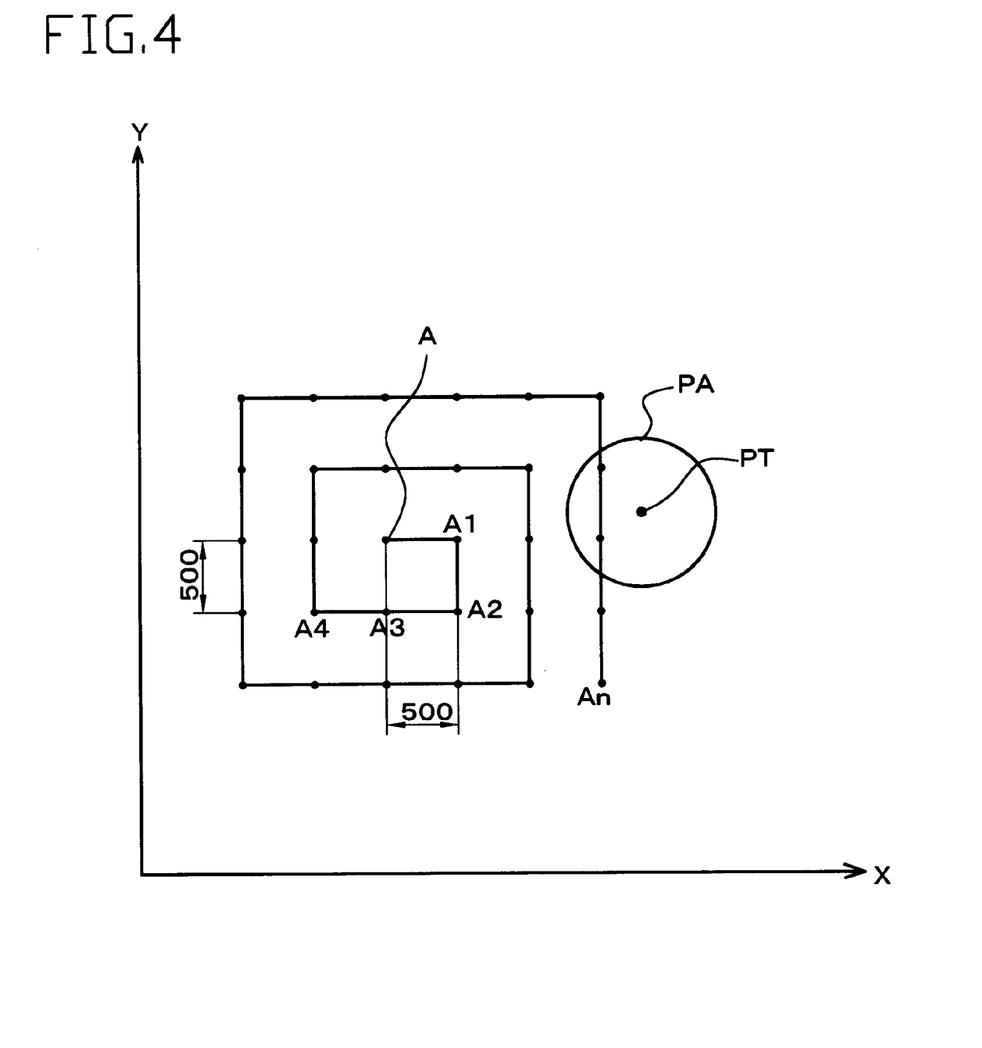
FIG. 4 is an explanatory diagram indicating an adjustment manner of a reflection mirror to detect an optimum angle thereof when no laser beam is detected by a laser sensor in the embodiment.

FIG. 4 is an explanatory diagram for the adjustment manner in the case where no laser oscillation is made even if a discharge is performed in the ion laser tube because the angle of the total reflection mirror is not proper. In FIG. 4, a point A indicates an initial position (angle) of the mirror 5. A circle PA indicates a range of the angle of the mirror 5 where the resonator 7 can oscillate laser beams, namely, a range where the quantity of laser light detected by the output sensor 26 is a predetermined level or more. A point PT indicates the optimum angle of the mirror 5 within the range PA, at which the optimum laser output can efficiently be obtained. This optimum laser output indicates a state where the laser output becomes a maximum level under a predetermined amount of current.

The control section 20 drives the motors 18a and 18b while causing the power source 24 to supply a predetermined amount of current to the resonator 7, thereby to adjust the angle of the mirror 5 by 500 pulses each with respect to the X-and the Y-axis directions respectively. The laser power output is detected in correspondence with each angle (A to An) of the mirror 5. It is to be noted that the number of pulses (500 pulses in the present embodiment) for one adjustment from an angle to the next is determined in consideration of the range (PA) of the laser output. Specifically, the range PA is set in advance so that it does not include three or more of points continuously provided with respect to each axis as shown in FIG. 4.

The mirror 5 is caused to scan while spirally changing its angular position from the point A to An (FIG. 4). When the angle of the mirror 5 comes into the range PA, the resonator 7 starts laser output. The output sensor 26 thus detects the laser output from the resonator 7.

On the other hand, when the output sensor 26 detects some laser output upon the supply of current to the resonator 7, the control section 20 determines the optimum angle of the mirror 5 by using the following adjustment manner so that the maximum laser output can be obtained with respect to the X-axis and Y-axis directions respectively.

Figure 5A:
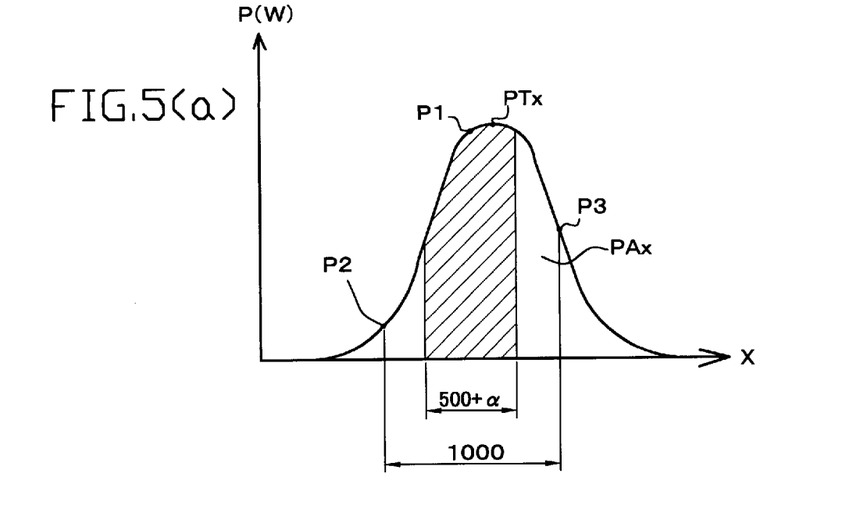
FIGS. 5(a) to 5(c) are graphs showing a laser output power distribution provided during the rotation of the reflection mirror with respect to an X-axis direction in the embodiment.
Figure 5B:
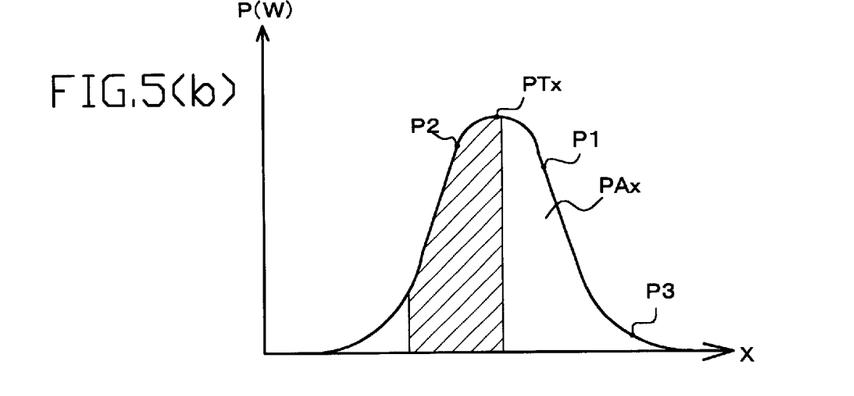
Figure 5C:
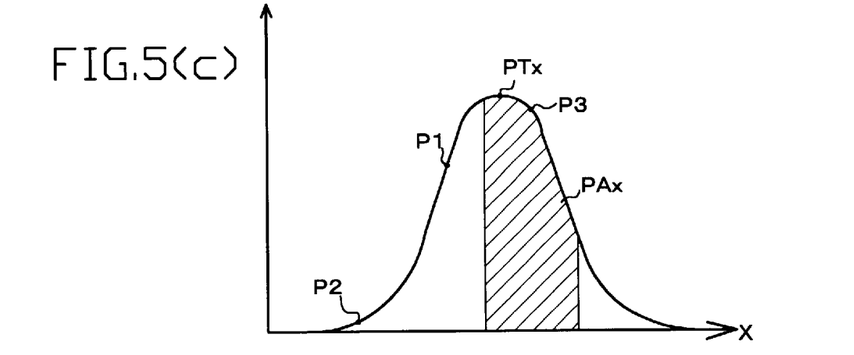

The control section 20 first drives the motor 18b to detect the angle of the mirror 5 with respect to the X-axis direction at which the maximum laser output is obtained. Specifically, the control section 20 drives the motor 18b to fine rotate the plate 13 mounting the mirror 5 about the Y-axis, swinging the side of the plate 13 with the adjust screw 16b disposed opposite to the screw 16c in the X-axis direction. FIGS. 5(a) to 5(c) are graphs showing the output distribution of laser power in relation to the angles of the mirror 5 with resect to the X-axis direction. In those graphs, an area PAx indicates the output range of laser during adjustment of the mirror 5 with respect to the X-axis direction and a point PTx indicates the maximum laser output value with respect to the X-axis direction. The control section 20 detects a first laser power corresponding to an initial position P1 of the mirror 5 and stores it in an output memory 27. Sequentially, the control section 20 rotates the mirror 5 (i.e., the movable plate 13) by a predetermined pulse (500 pulses) in a predetermined direction (a first direction) toward a second position P2 and detects a second laser power. This second laser power is also stored in the output memory 27. Furthermore, the control section 20 rotates the mirror 5 by a predetermined pulse (1000 pulses) in an opposite direction (a second direction) to the first direction toward a third position P3 which is opposite to the second position P2 with respect to the first position P1. For accurately positioning the mirror 5 to the position P3, the control section 20 drives the motor 18b by 1000+α pulses to rotate the mirror 5 once in the second direction and drives the motor 18b by α pulses to rotate the mirror 5 back in the first direction by corresponding pulses toward the position P3. In this manner, the mirror 5 is always rotated in the predetermined direction to be placed in each position P1, P2, or P3. This makes it possible to reduce an error of angle caused by backlash of gears, thereby achieving an accurate adjustment. Then, the control section 20 detects the laser output corresponding to the position P3 of the mirror 5 and stores it in the output memory 27.

The control section 20 compares the output values obtained at the three positions (P1, P2, and P3) and stored in the output memory 27 to determine the position where the maximum laser output value PTx with respect to the X-axis direction is obtained. Three conditions in the embodiment will be explained below.

A first case where the output value corresponding to the position P1 is highest:

If P1 is highest among the output values obtained at the three positions, the output power is graphed as FIG. 5(a). The control section 20 scans the range (a part filled with oblique lines in FIG. 5(a)) defined by more than half of the number of pulses needed to rotate the mirror 5 between the positions P2 and P3 centering P1 (in this case, 250+several pulses each on both sides of P1). Also in this case, the control section 20 operates to slowly rotate the mirror 5 within the range defined as above in the predetermined direction (the first direction, i.e., from the right to the left in the embodiment) to reduce an error caused by the backlash or play of the motor, while the control section 20 detects the laser output values through the sensor 26. In this embodiment, the laser output is detected per 10 pulses, and only the maximum output value and the corresponding angle are stored in the output memory 27. By such the scan in the range defined by the 250+sevral pulses centering P1, the control section 20 obtains the maximum output value PTx. The control section 20 causes the mirror 5 to rotate in the predetermined direction toward the position where the maximum laser output value is obtained.

A second case where that the output value at the position P2 is highest:

If P2 is highest among the output values obtained at the three positions, the output power is graphed as FIG. 5(b). The control section 20 scans the range (a part filled with oblique lines in FIG. 5(b)) defined by more than half of the number of pulses needed to rotate the mirror 5, centering P2 (in this case, 250+several pulses each on both sides of P2). Similarly to above, the laser output is detected per 10 pulses, and only the maximum output value and the corresponding angle are stored in the output memory 27. By such the scan in the range defined by the 250+several pulses centering P2, the control section 20 obtains the maximum output value PTx. Then, the control section 20 causes the mirror 5 to rotate in the predetermined direction to the position where the maximum laser output value is obtained.

A third case where that the output value at the position P3 is highest:

If P3 is highest among the output values obtained at the three positions, the output power is graphed as FIG. 5(c). The control section 20 scans the range (a part filled with oblique lines in FIG. 5(c)) defined by more than half of the number of pulses needed to rotate the mirror 5, centering P3

(also in this case, 250+several pulses each on both sides of P3). In the same way as above, the laser output is detected per 10 pulses, and only the maximum output value and the corresponding angle are stored in the output memory 27. By such the scan in the range defined by the 250+sevral pulses centering P3, the control section 20 obtains the maximum output value PTx. Then, the control section 20 causes the mirror 5 to rotate in the predetermined direction to the position where the maximum laser output value is obtained.

Subsequently, when the optimum angle of the mirror 5 with respect to the X-axis at which the maximum laser output value is obtained under a predetermined amount of current, the control section 20 uses only the motor 18a to adjust the angle of the mirror 5 with respect to the Y-axis in the same manner as the case of X-axis, thereby to detect the optimum angle of the mirror 5, at which the maximum laser output value PTy (PT) is obtained. Specifically, the control section 20 drives the motor 18a to fine rotate the plate 13 mounting the mirror 5 about the X-axis, swinging the side of the plate 13 with the adjust screw 16a disposed opposite to the screw 16c in the Y-axis direction. Thus, the optimum angle PT of the mirror 5 with respect to the X-axis and the Y-axis is determined.

Next, the control section 20 uses the motor 19 to rotate the mirror 6 to be placed on the optical path L. Under the same adjustment control as for the mirror 5, the optimum angle of the mirror 6, at which the laser output is the most efficient, is determined. Upon completion of all the adjustment, the control section 20 stops the discharge of current from the laser power source 24 to the resonator 7, thereby completing the initial setting.

In the laser output adjustment manner for the laser treatment apparatus in the embodiment, the control section 20 compares three output values of laser beams corresponding to the three positions P1–P3 of the mirror(s), and scans the range centering the highest value among the three output values to determine the optimum angle of the mirror. The angle of the mirror may also be determined in the following adjustment manner.

After detection of the laser output values corresponding to the positions P1–P3, the output values corresponding to the positions P2 and P3 are compared. If P3>P2 (corresponding to the cases shown in FIGS. 5(a) and 5(c)), the maximum value PTx naturally exists between P1 and P3. By the scan from P3 to P1, therefore, PTx can be determined. Alternatively, if P3<P2 (corresponding to the case shown in FIG. 5(b)), the maximum value PTx naturally exists between P1 and P2 and, PTx can be determined by the scan from P1 to P2.

The present invention may be embodied in other specific forms without departing from the spirit or essential characteristics thereof. For instance, although the ion laser tube is used in the above embodiment, any laser tube may be used if only it has reflection mirrors arranged on both sides of the tube for resonating and emitting laser beams.

Furthermore, the positions P2 and P3 in the embodiment are determined to be placed, centering the position P1, on both sides of the position P1 by 500 pulses each. Instead thereof, any range may be applied if only it can provide the optimum position where the efficient laser output can be obtained in the above mentioned manner.

In the above embodiment only the reflection mirrors are operated one-by-one. Alternatively, only the output mirror may be driven or the two reflection mirrors 5 and 6 may be driven simultaneously. This can also provide the accurate laser output with high oscillating efficiency.

Although the pulse motor is used in the above embodiment to perform open control based on the number of pulses, a servo motor may be used instead of the pulse motor, thereby to detect a rotating angle through an encoder under feedback control.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A laser apparatus for generating laser light beams including:
   a laser oscillation device for oscillating laser beams;
   a resonation device with a plurality of reflection mirrors for reflecting the laser beams oscillated by the laser oscillation device;
   a rotation device for rotating at least one of the reflection mirrors about a first axis and a second axis respectively, the second axis intersecting the first axis at a predetermined angle;
   a light quantity measurement device for measuring a light quantity of the laser beams emitted from the resonation device;
   a rotation angle determination device for determining a first rotation angle at which the light quantity measurement device detects an output of the laser beam from the resonation device while the reflection mirror is rotated about the first axis and the second axis respectively, and for determining a second rotation angle and a third rotation angle which are on opposite sides of the first rotation angle;
   a rotating range determination device for determining a rotating range of the reflecting mirror, the range including a rotation angle at which a maximum quantity of laser beam is obtained, based on measurement values measured by the light quantity measurement device when the reflection mirror is positioned at the first, second, and third rotation angles determined by the rotation angle determination device, and
   an angle determination device for determining an optimum rotation angle of the reflection mirror with respect to the first axis and the second axis respectively, at which the maximum quantity of laser beam is obtained, based on the measurement values measured by the light quantity measurement device when the reflection mirror is rotated successively within the rotating range determined by the rotating range determination device.

2. The laser apparatus according to claim 1, wherein the rotation device rotates the reflection mirror sequentially at first predetermined intervals in order to search the first rotation angle.

3. The laser apparatus according to claim 2, wherein an interval defined by the second rotation angle and the first rotation angle and an interval defined by the third rotation angle and the first rotation angle are both the same first predetermined interval,
   wherein the reflection mirror is rotated within the rotating range determined by the rotating range determination device at second predetermined intervals which are smaller than the first predetermined intervals.

4. The laser apparatus according to claim 1, wherein the rotating range determined by the rotating range determination device is a predetermined range centering one rotation angle at which the largest light quantity is obtained, selected from among the first, second, and third rotation angles.

5. The laser apparatus according to claim 1, wherein the rotating range determination device compares the light quantity of laser beams corresponding to the second rotation angle and that corresponding to the third rotation angle, and, the rotating range determination device determines the rotating range to be a range defined by the first and second rotation angles if the light quantity corresponding to the second rotation angle is larger, alternatively, a range defined by the first and third rotation angles if the light quantity corresponding to the third rotation angle is larger.

6. The laser apparatus according to claim 1, wherein the rotation device rotates one of the reflection mirrors about the first axis and the second axis respectively.

7. The laser apparatus according to claim 1, wherein the resonation device comprises two reflection mirrors, and the rotation device rotates one of the reflection mirrors about the first axis and the second axis respectively.

8. The laser apparatus according to claim 1, wherein the laser oscillation device oscillates a laser beam having a plurality of dominant wavelength regions.

9. The laser apparatus according to claim 1, wherein the laser oscillation device oscillates a laser beam having a plurality of dominant wavelength regions, wherein the plurality of the reflection mirrors of the resonation device includes different wavelength reflection mirrors having a property of reflecting light of different wavelength, wherein the rotation device rotates the different wavelength reflection mirrors about the first axis and the second axis respectively.

* * * * *